United States Patent [19]
Becker et al.

[11] 3,813,731
[45] June 4, 1974

[54] FINELY PERFORATED ARTIFICAL GAS AND WATER VAPOR PERVIOUS WRAPPING FOR FOODSTUFFS

[75] Inventors: Heinz Becker, Hamburg-Blankenese; Karl-Heinz Steigerwald, Munich, both of Germany

[73] Assignee: Steigerwald Strahltechnik GmbH, Munich, Germany; by said Steigerwald

[22] Filed: Dec. 21, 1970

[21] Appl. No.: 99,918

[30] Foreign Application Priority Data
Dec. 19, 1969  Germany.......................... 1963798

[52] U.S. Cl............................ 17/34, 17/32, 99/441, 99/485, 426/105
[51] Int. Cl................................................ A22c 7/00
[58] Field of Search................ 99/176, 175, 171 LP; 250/49.5 R; 161/109, 110; 17/34.32

[56] References Cited
UNITED STATES PATENTS

| | | | |
|---|---|---|---|
| 2,000,835 | 8/1935 | Goldberger........................... | 99/176 |
| 2,125,025 | 7/1938 | Huckfeldt.............................. | 99/176 |
| 2,129,832 | 9/1938 | Eckrick................................. | 99/176 |
| 2,267,752 | 12/1941 | Ruska ........................... | 250/49.5 R |
| 2,430,818 | 11/1947 | Kellerman.......................... | 99/175 X |
| 2,493,063 | 1/1950 | Frank..................................... | 99/176 |
| 2,545,243 | 3/1951 | Rumsey ........................... | 99/176 X |
| 2,575,467 | 11/1951 | Reichel................................. | 99/176 |
| 2,608,488 | 8/1952 | Rumsey ................................ | 99/176 |
| 2,638,624 | 5/1953 | Wade................................ | 99/176 X |
| 2,735,354 | 2/1956 | Edgar............................. | 99/171 CA |
| 2,751,306 | 6/1956 | Snyder.......................... | 95/171 MP |
| 2,988,451 | 6/1961 | Zann..................................... | 99/176 |
| 3,037,868 | 6/1962 | Rosser ........................... | 99/176 X |
| 3,427,169 | 2/1969 | Rose...................................... | 99/176 |
| 3,451,827 | 6/1969 | Bridgeford........................... | 99/176 |
| 3,464,832 | 9/1969 | Mullinix............................... | 99/174 |
| 3,552,637 | 1/1971 | Swinford............................. | 99/176 |
| 3,594,261 | 7/1971 | Broerman........................... | 161/110 |

FOREIGN PATENTS OR APPLICATIONS

| | | | |
|---|---|---|---|
| 18,031 | 4/1915 | Great Britain........................ | 99/176 |
| 353,700 | 3/1921 | Germany .............................. | 99/176 |
| 290,384 | 11/1931 | Italy................................. | 99/171 LP |
| 583,351 | 10/1958 | Italy...................................... | 99/176 |
| 6,709,291 | 1/1969 | Netherlands......................... | 161/109 |
| 1,220,999 | 7/1966 | Germany .............................. | 99/176 |
| 1,907,321 | 10/1964 | Great Britain........................ | 99/176 |
| 790,200 | 6/1956 | Great Britain ................ | 99/171 CA |
| 1,260,250 | 3/1961 | France................................... | 99/176 |

OTHER PUBLICATIONS
Food Mfr., Dec. 1959, pg. 493, Controlled Ventilation Polythene.

*Primary Examiner*—Robert Halper
*Attorney, Agent, or Firm*—Sandoe, Hapgood & Calimafde

[57] ABSTRACT

The artificial wrapping for foodstuffs comprises perforations produced by energy beams, e.g., electron beams. These perforations can be made very precisely yet extremely fine in a great variety of materials, e.g., plastic, metal, glass, ceramic, or glass-ceramic.

1 Claim, 7 Drawing Figures

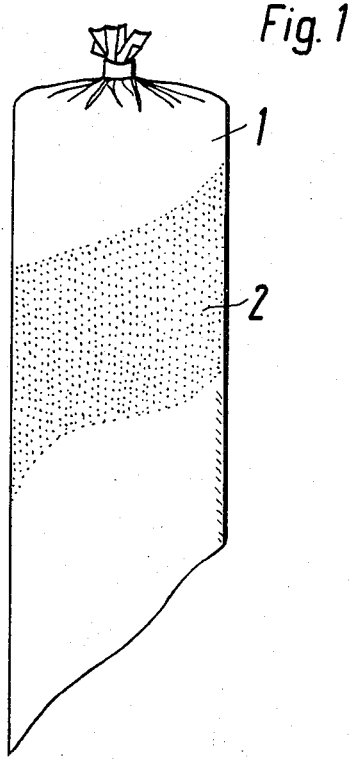
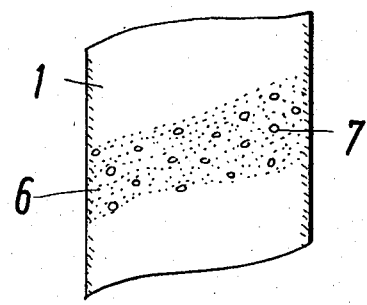
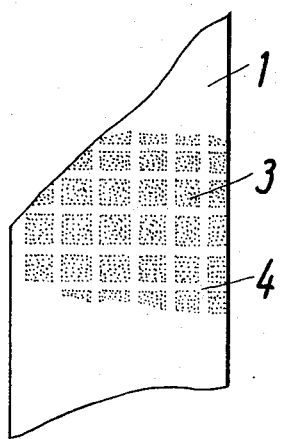

FINELY PERFORATED ARTIFICAL GAS AND WATER VAPOR PERVIOUS WRAPPING FOR FOODSTUFFS

FIELD OF THE INVENTION

The invention relates to an artificial gas- and water vapor-pervious wrapping for foodstuffs, particularly artifical sausage wrappers or skins.

It has been a known established practice to use animal's guts for sausage skins. Although such animal's guts show many desirable properties like gas and water vapor permeability (capability of breathing) and elastic pliability, they are not available in sufficient quantities for the continuously growing demand for sausage skins. Moreover, their extraction and preparation is comparatively costly, time-consuming and frequently hygienically objectionable.

For these reasons, various kinds of artificial sausage skins have been developed and put into practical use. These artificial sausage skins are produced from plastic or natural raw materials.

A great number of artificial sausage skins or wrappings have become known. These wrappings, however, do not have the properties of natural guts; they are practically impervious for gas and water vapor and can be used only for boiled sausages and similar purposes.

Furthermore, artificial sausage wrappings which are pervious for gas and water vapor have become known which e.g., are produced from skin waste and are suitable for the production of scalded sausages or raw sausages. Still further, artificial sausage wrappings have become known which e.g., are made from paper fibres impregnated with viscose and are said to be also suited for scalded sausages and raw sausages.

The known gas- and water vapor-pervious articifial sausage wrappings, however, do not meet all requirements, and moreover their production is comparatively very costly.

It is the object of the present invention to provide artificial gas- and water vapor-pervious wrappings for foodstuffs, particularly for sausages, which wrappings show to a high degree similar properties as natural guts (animal's guts) and particularly are capable of breathing, the degree of breathing capability being preferably controllable. Furthermore, it is an object of the invention to provide a method for producing such artificial wrappings, which is technically advantageous and meets all hygienic requirements.

SUMMARY OF THE INVENTION

According to the invention, an artificial gas- and water vapor-pervious wrapping for foodstuffs, particularly sausages, is characterized in that its permeability properties are obtained by means of perforations which have been produced by means of energy beams.

The perforations can be produced for example by means of focused electromagnetic beams or corpuscular beams.

As electromagnetic beams, preferably laser beams can be used which can be produced by means of a solid state laser (e.g., a ruby laser) or by means of a gas laser (e.g., a $CO_2$-laser).

As corpuscular beams, one may use e.g., ion beams (e.g., an ionized gas jet) obtained from a gas discharge ion source, or particularly electron beams.

The invention will be subsequently explained particularly with regard to the application of electron beams for the production of the perforations. To this end, devices may be used which are described in the U.S. Pat. No. 3,371,190 or the British patent No. 1,163,529.

The artificial wrappings in accordance with the invention may have perforations corresponding to 50 to 500,000 holes/per square centimeter, particularly 100 to 10,000 holes per square centimeter, preferably 100 to 300 holes per square centimeter.

The shape of the holes can be chosen arbitrarily.

The perforations can have a mean diameter in the range of 5 to 200 $\mu$m, particularly 50 to 200 $\mu$m, preferably 120 to 180 $\mu$m.

The artificial wrappings in accordance with the invention have properties which are to a high degree similar to those of natural guts of slaughtered animals and have a controllable breathing capability.

The water vapor permeability of the artificial wrapping according to the invention may be 1 to 100 mg/cm$^2$ hours, and their gas permeability may lie between 100 and 10,000 cm$^3$/min. cm$^2$.

As materials for the wrappings in accordance with the invention, numerous plastic materials are suitable which particularly show the property that they are elastically pliable. Furthermore, wrappings made of regenerated cellulose or cellulose derivatives such as cellulose esters or cellophane (hydrated cellulose) may be used. The invention makes possible to make artificial wrappings for foodstuffs which have a controllable breathing capability and a substantial thickness so that the wall of the wrapping is capable of withstanding all strains and loads occurring during treatment of the foodstuffs.

Moreover, the wrappings in accordance with the invention are also suitable for other smoked or heat-treated foodstuffs, e.g., for the production of smoked cheese.

In accordance with a special embodiment of the invention, the artificial wrapping is designed as a permanent mold for the treatment of foodstuffs, particularly sausages, which mold comprises a hollow body member provided with detachable end closure means, the wall of said body member having perforations produced by means of energy beams, particularly by means of electron beams.

The wall of the hollow body member for the permanent mold can be made of metal like stainless steel or aluminium. The metal may be coated wholly or partly with plastic material which is permissible for foodstuffs and preferably is selected with a view to reduce adhesion. Examples for such plastics are polyethylene or polytetrafluorethylene.

Furthermore, the wall of the permanent mold can consist of plastic, glass or ceramic.

Generally, the wall of a permanent mold may have a thickness of 0.1 to 5 mm, particularly 0.5 to 1 mm. Preferably, the wall is provided with perforations over its whole circumference and its whole length, said perforations being produced by means of energy beams, particularly by electron beams. As examples for glass, high quartz-containing glasses or quartz substitute glasses and fireproof glasses may be mentioned. As examples for ceramics, elastic porcelain-like ceramic masses containing magnesium silicates and forming impervious bodies, or glass-ceramic may be mentioned.

In accordance with a special embodiment of the invention, the material of the wrapping consists of elastically pliable heat-weldable plastic like polyvinyl chloride, polyvinylidene chloride, polyethylene or polypropylene. Materials which are not per se heat-weldable may be provided with a heat-weldable coating, e.g., a coating comprising a mixture of nitro cellulose and wax, or a co-polymer of polyvinylidene chloride and vinyl chloride.

In accordance with a special embodiment, the perforations as produced in the artificial wrapping by means of energy beams may be provided in selected areas only, e.g., they may be distributed window-like with remaining grid-like webs, or in strip-like fields between remaining strip-like webs.

The artificial wrappings in accordance with the invention are suited for numerous foodstuffs. They are particularly important for sausages which are subjected to reddening or riping, drying and preservation, including smoking, scalding, etc.

It may be advantageous to arrange the wrapper in accordance with the invention so that the side thereof where the perforation-producing energy beam had left the wrapper material is facing the filler material enclosed by the wrapping.

The present invention further relates to a method of producing gas- and water vapor-pervious artificial wrappings for foodstuffs, particularly sausages, in which hose-shaped plastic wrappers or artificial wrappers made of e.g., cellulose like cellophane which, if desired, may be provided with a coating, are subjected in a folded or reefed condition to the action of focused energy beams like corpuscular beams, particularly electron beams. In doing so, the hose-shaped wrappers, in their folded condition, may be continuously moved along below a source of focused energy beams.

On the other hand, it is also possible to subject films in a folded or reefed condition with several layers lying one above the other, to the action of focused corpuscular beams with the films being moved continuously or intermittently.

In the perforation of the material for the wrappings, selected areas of the folded wrappings or foils may be subjected to the action of focused energy beams, whereby strip-like or grid-like portions remain unperforated.

In accordance with a further embodiment of the invention, there may be a surface treatment in order to give the whole wrapping or film and/or the walls of the perforations or a part or one side of the film (with or without the walls of the perforations) hydrophilic properties. Suitable agents therefor are dispersions or, if desired, colloidal aqueous solutions of protein materials like gelatine glue, albumin, or of starch, or of pectin materials.

Still further, measures can be taken to obtain a capillary transport action at the surface of the film, with suitable substances like collagen dispersions being applied within and/or outside the perforations, which substances provide capillary cavities or interconnected pores after drying.

Still further, it is also possible to coat e.g., the outer surface of the perforated wrappings with a coating of hydrophobic material like sodium oleate or glycerine mono/distearate. Other fatty acid derivatives can be used for this purpose.

To obtain hydrophilic or hydrophobic properties of the surface, also pure surface treatment processes may be applied, e.g., chemical treatments or irradiations.

In the above-mentioned embodiments wherein a treatment of the surfaces of the wrapping material and, if desired, of the walls of the perforations takes place, it may be advisable to roughen the surface of the wrapping material on one or both sides thereof.

The above-mentioned treatments all have the purpose to facilitate the exchange processes between the filler material and the treatment or smoking chamber. Particularly, they make the properties of a perforated wrapping more similar to that of natural guts, e.g., by providing surface layers having hydrophilic or capillary-active properties and being capable of absorbing all the liquid or gaseous components of the filler material, and/or to conduct them to the other surface of the wrapping. If this other surface by means of a coating or roughening has been designed so that its really effective surface is substantially larger than the surface given by it macroscopic dimensions, a substantial improvement of the exchange processes between the treating atmosphere and the filler material is obtained.

A treatment of the outer surface of the wrappings with hydrophobic material may be advisable in order to improve the durability of the goods enclosed by the wrappings.

The wrapping material may be roughened, grained or embossed in order to improve also the visual similarity with natural guts. Moreover, the wrapping material may be pre-smoked in liquid or gaseous smoking agents. Still further, it is possible to give the wrapping material a desired colour, e.g., a dark-brown, golden-brown or black colour.

Also lettering or printing may be inserted prior to or subsequent to the perforation process.

In accordance with a special embodiment of the invention, a process for producing gas- or water vapor-pervious wrappings for permanent molds for foodstuffs, in which molds these foodstuffs can be treated and stored, hollow bodies of metal, plastic, glass, ceramic or glass-ceramic may be subjected in a clamping device to the action of focused energy beams, particularly electron beams, with these hollow bodies being continuously or intermittently rotated and, if desired, advanced continuously or intermittently.

For permanent molds, the wrappings have such wall thicknesses that they are capable of withstanding all pressures which may occur. The invention will be subsequently described in more detail by means of examples.

EXAMPLE 1

Production of Coarse Soft German Sausage

A filler material for coarse soft German sausage, which had been prepared and spiced in the usual manner, was filled into artificial wrappings (diameter about 40 mm) consisting of polyethylene film perforated by means of electron beams (70 $\mu$m, 5,000 holes/cm$^2$) and subdivided by means of clamps or clips into lengths of 14 cm.

The sausages were introduced into a smoking and boiling installation for steam smoking and were reddened at a chamber temperature of approximately 30°C for approximately 2 hours, with the core temperature rising from 20° to 28°C. The moisture was between 54 and 42 percent.

Thereafter, the product was dried for approximately half an hour, with the moisture falling from 42 to 15 percent. Finally, there followed a cold smoking process at an alternating chamber temperature of 20° to 29°C and at a moisture of 15 to 53 percent.

After a total treating time of little more than 5 hours the treatment of the soft German sausage was finished. The product obtained was very good and very intensely smoked. The weight loss was approximately 0.3 percent.

EXAMPLE 2

Production of Scalded Sausages (Plain)

Filler material for scalded sausages (plain), which had been prepared and spiced in the usual manner, was filled into artificial wrapping (diameter about 32 mm) consisting of polyethylene film perforated by means of electron beams (50 $\mu$m, approximately 8,000 holes/cm$^2$), subdivided at suitable lengths, and treated in a smoking and boiling installation for steam smoking, with approximately the following conditions being present:

Reddening:

| | |
|---|---|
| Chamber temperature: | 45°C |
| core temperature: | 19 to 38°C |
| moisture: | 63 to 54% |
| Drying: | |
| Chamber temperature: | 45 to 60°C |
| core temperature: | 38 to 42°C |
| moisture: | 53 to 14% |
| Smoking: | |
| chamber temperature: | 60 to 65°C |
| core temperature: | 42 to 52°C |
| moisture: | 14 to 95% |
| Scalding: | |
| chamber temperature: | 65 to 78°C |
| core temperature: | 52 to 72°C |
| moisture: | 100% |

After a total treating time of less than 1.5 hours, the treatment of the scalded sausages was finished. The colour of the product obtained was very good, the product was properly reddened throughout. The weight loss was approximately 6.7 percent.

EXAMPLE 3

Production of Smoked Boiled Sausages

Filling material for smoked boiled sausages, which had been prepared and spiced in the usual manner, was filled into artificial wrappings (diameter about 42 mm) consisting of polypropylene film perforated with electron beams (150 $\mu$m, about 200 holes/cm$^2$), subdivided into suitable lengths, and treated in a smoking and boiling installation for steam smoking, with approximately the following conditions being present:

Drying:

| | |
|---|---|
| Chamber temperature: | 55 to 65°C |
| core temperature: | 12 to 40°C |
| moisture: | 64 to 14% |
| Smoking: | |
| Chamber temperature: | 70 to 76°C |
| core temperature: | 40 to 58°C |
| moisture: | 14 to 96% |
| Boiling: | |
| Chamber temperature: | 78°C |
| core temperature: | 58 to 70°C |
| moisture: | 100% |

After a total treating time of approximately 1¼ hours, the treatment of the smoked boiled sausages was finished. The product obtained was good, its colour was good and intense. The weight loss was about 1.5 percent.

The invention will be subsequently described in more detail in connection with the drawings.

FIG. 1 shows a part of a sausage wrapping perforated in accordance with the invention.

FIG. 2 is a partial view of a modified embodiment.

FIG. 3 is a partial view of a further embodiment of a sausage wrapping perforated in accordance with the invention.

Figure 4:
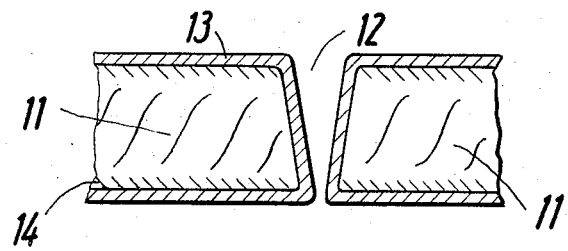
FIG. 4 is a schematical section, at a considerably enlarged scale, through a perforation, the surface of the wrapping material and the wall of the perforation being provided with a coating.

According to FIG. 1, the wrapping 1 which e.g., may serve as a sausage skin, consists of e.g., polypropylene or polyethylene film. The wrapping is provided with a plurality of perforations 2 which are produced by means of electron beams. The perforations are shown in the drawing at an enlarged scale. They can have a round cross-section. If desired, however, they may also have an elongated cross-section. In the embodiment shown, the perforations are distributed substantially uniformly across the whole wrapping.

In the embodiment according to FIG. 2, window-like areas 3 in the wrapping have been perforated by means of electron beams, whereby webs 4 remain between these areas, which give the perforated wrapping a substantial strength. The areas 3 are substantially uniformly pierced by perforations 5.

In the embodiment according to FIG. 3, the wrapping is also substantially uniformly pierced by fine perforations 6 between which larger openings 7 are provided.

For certain applications and filler materials, e.g., raw sausage filler, a combination of fine perforations 6 and larger openings 7 will produce particularly favorable results.

In FIG. 4, the wrapping material is designated 11, the material being traversed by a perforation 12. On the surfaces of the wrapping material, and on the walls of the perforation 12, a coating 13 of hydrophilic material, e.g., gelatine, is provided. The surface of the wrapping material 11 is roughened on both sides, as schematically indicated at 14. In this embodiment, the diameter of the perforation 12 is larger than the particle size of the hydrophilic material.

Figure 5:
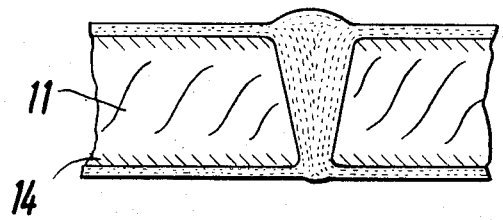
FIG. 5 illustrates schematically, at a strongly enlarged scale, an embodiment of the invention wherein the surface of the wrapping material is provided with a capillary-active coating, and the perforation is filled with a capillary-active material.

FIG. 5 shows another embodiment of a perforated wrapping material in accordance with the invention. Also there, the wrapping material 11 is roughened, as indicated at 14. A capillary-active material 13a is provided on the surface, this material also filling the whole interior space of the perforation 12. The capillary-active material may consist of a collagen product having throughgoing capillary paths or interconnected pores. A product of that kind is commercially available under the designation "Devro."

In the embodiments according to FIGS. 4 and 5, the coating may consist also of a natural material, particulary of a material prepared from animal materials. In this case, there is the advantage that a particularly small amount is needed, whereas in all other aspects the mechanical and other functions are performed by the plastic or artificial wrapping.

Figure 6:
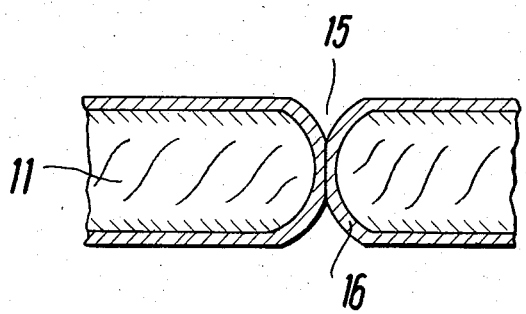
FIG. 6 shows schematically, at a strongly enlarged scale, a sectional view through a perforation of a further embodiment of the invention.

FIG. 6 illustrates a further embodiment of a perforated wrapping material in accordance with the invention. In this case, the perforation 15 is on both sides, i.e., on the entering and the exit side of the perforating beam, shaped notch-like, with the central portion of the perforation being restricted. The walls of the perforation 15 are provided with a coating 16 of e.g., capillary-active material.

The goods contained in wrappings perforated in accordance with the invention can be subjected to the action of sonic vibrations, particularly ultrasonic vibrations, during the necessary treatment, e.g., during the reddening, smoking and, if desired, scalding process in order to accelerate or intensify the treatment.

The films of heat-weldable plastic or a material provided with a heat-weldable coating, and having perforations produced by means of energy beams like corpuscular beams, can be used for the production of portion packages of foodstuffs, particularly sausages, with the perforated films being drawn by means of a shaping device from a supply roll over a shaping tube or a spike, thereafter being formed into a hose-shaped wrapper and sealingly welded by the application of heat, the wrapper produced then being filled with a filler mass, and the filled sausage strand then preferably being subdivided into portions and ligatured or closed by a clip and thereafter being subjected to a ripening, drying, smoking and, if desired, boiling process, the strand thereafter being cut into individual portion packages.

Figure 7:
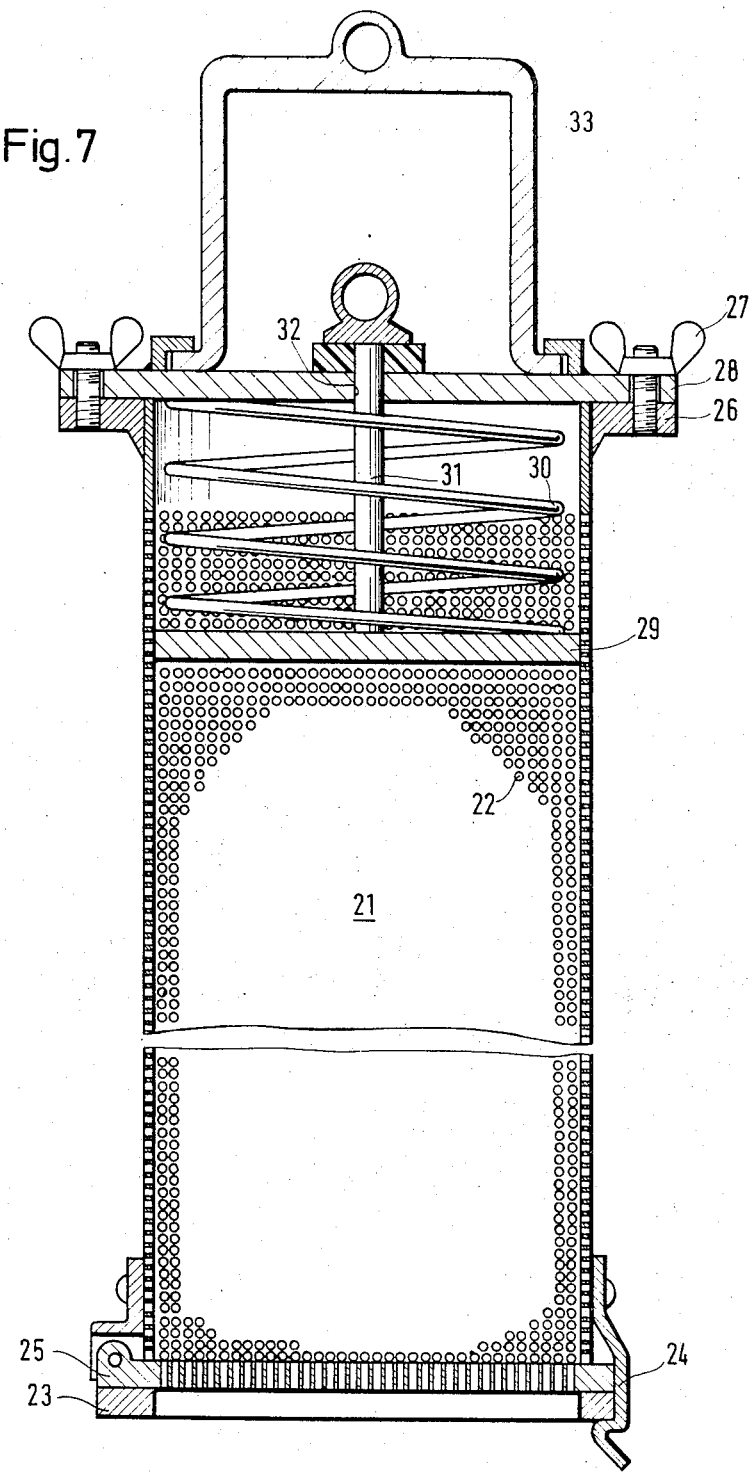
FIG. 7 shows schematically in a sectional view a wrapping which is perforated in accordance with the invention and is designed as a permanent mold.

FIG. 7 illustrates a special embodiment of a perforated wrapping in accordance with the invention, which is intended for use as a permanent mold for the treatment of sausages, particularly hard sausages. The wrapping comprises a hollow body member 21 which e.g., may have a circular, elliptic, rectangular or square cross-section. The hollow body member 21 is made of metal like stainless steel or aluminium, and is provided over its whole length with perforations 22 which had been produced by means of electron beams. The perforations are shown at an enlarged scale in the drawing. In the illustrated embodiment, the perforations are substantially uniformly distributed over the whole wrapping. The hollow body member is provided with end closure means on both ends. At one end, the end closure means consists of an end plate 23 which is also perforated in accordance with the invention and is pivotally supported by means of a hinge 25 secured on the hollow body member. The end plate 23 is held in the closing position by means of a resilient holding bracket 24. On the other side, there is provided a head piece 26 snugly encircling the circumference of the hollow body member. On the head piece 26, a closure plate 28 is secured by means of thumb screws 27. In the embodiment illustrated, only two thumb screws are shown; preferably, however, four threaded connections are provided in order to obtain a secure seal. In the interior of the hollow body member 21, a piston plate 29 is displaceably arranged. This piston plate is under the action of a compression spring 30 supported on the closure plate 28. The piston plate 29 is guided by means of a piston rod 31 extending through an opening 32 provided in an extension of the closure plate 28. A stirrup 33 is provided on the closure plate 28 as a suspension means for the permanent mold.

In the use of the permanent mold, after having installed the closure plate 23, the space in the hollow body member 21 is filled with a filler material, e.g., for coarse soft German sausage, which has been prepared and spiced in the usual manner. Thereafter, the piston plate 29 is inserted, and the permanent mold is closed by means of the closure plate 28. The thus filled permanent mold is then suspended by the aid of the stirrup 33, e.g., on a spit, and thereafter the permanent mold is subjected to the desired treatments as they have been described e.g., in the Example 1.

During the treatment, the filling material shrinks by about 15 to 20 percent, with the result that the spring 30 expands and displaces the piston plate 29 inwardly so that always a desired pressure is exerted on the filler material, which pressure ensures the coherence of the finished sausage.

In order to take into account also a shrinkage which is accompanied by a reduction in the diameter of the filling material, the hollow body member 21, if desired, may be slit throughout at least once, with the longitudinal sides of the slit envelope of the hollow body member being overlapping each other (not shown in the drawing). In that case, one or several clamps encircling the circumference of the hollow body member may be provided, with the clamping pressure being selected sufficiently large to ensure uniform engagement of the interior wall surface of the hollow body member with the surface of the filling material with varying degrees of shrinkage.

On the end closure means, sealing means are provided which are capable of adapting themselves to the reduction of the cross section of the hollow body member. Furthermore, in this embodiment, the piston plate 29 may comprise elastic or yielding sealing means on its circumference.

When the treatment has been finished, and after the end closure means have been opened, the sausage obtained is ejected and preferably automatically cut into slices which then e.g. are packed in air-tight manner.

The permanent mold, after being cleaned, can then again be used for the production of sausages.

The application of the wrapper according to FIG. 7, which wrapper forms a permanent mold, makes possible the production of a very good and intensely smoked sausage product which can be sliced without the necessity to remove a skin.

The hollow body member 21 has a wall thickness and strength selected so that it withstands all pressures occurring. The hollow body member can be provided with a plastic coating, e.g., of polytetrafluorethylene, at least on the side which faces the filling material. Furthermore, it is possible to make the wrapper of plastic, glass, dense ceramic and glass-ceramic. In this case, the end closure means may be made of metal or plastic.

We claim:

1. An artificial gas and water vapor pervious permanent mold for treating foodstuffs such as sausages comprising a hollow body member made of metal, plastic, glass, ceramic or glass-ceramic material normally substantially impervious to gas and water vapor, said hollow body member being provided with a multiplicity of spaced perforations produced by means of focused energy beams, said perforations having a mean diameter within the range of 5 to 200 microns and occurring within a range of 50 to 500,000 per square centimeter, said perforated hollow body member having a water vapor permeability of from 1 to 100 mg/cm² hours and a gas permeability of between 100 and 10,000 cm³/min cm², said hollow body member comprising detachable end closure members, at least one of said end closure members being provided with a multiplicity of spaced perforations produced by means of focussed energy beams, said perforations having a means diameter within the range of 5 to 200 microns and occurring within a range of 50 to 500,000 per square centimeter.

* * * * *